May 30, 1939.   G. A. SWENSON   2,160,568
STONE WORKING TOOL
Filed Nov. 2, 1938
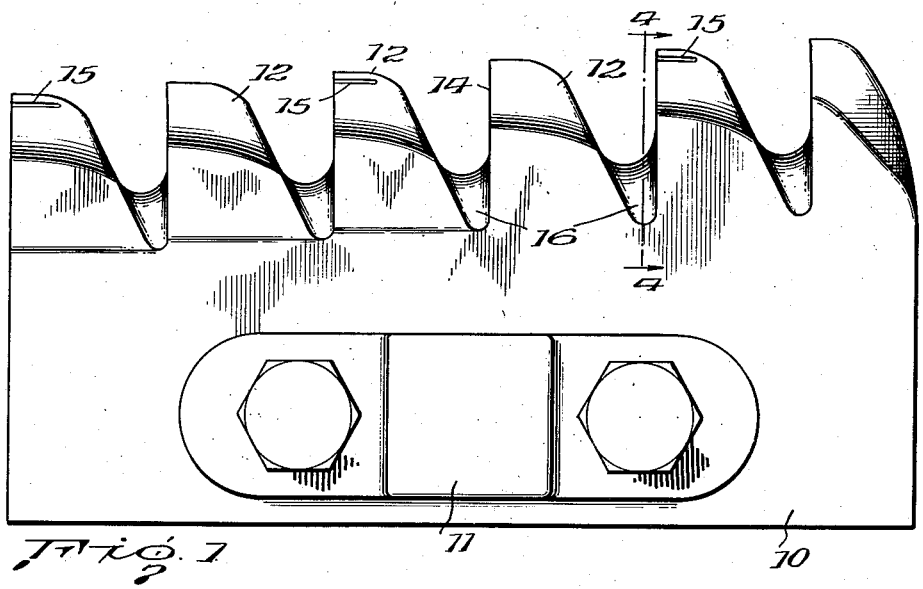
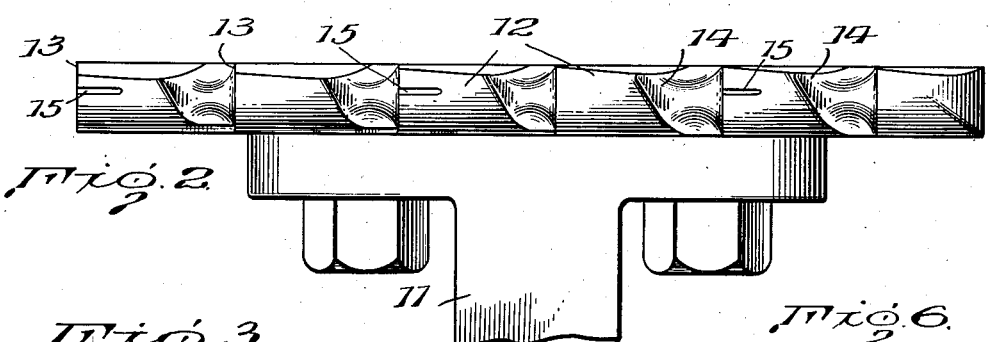
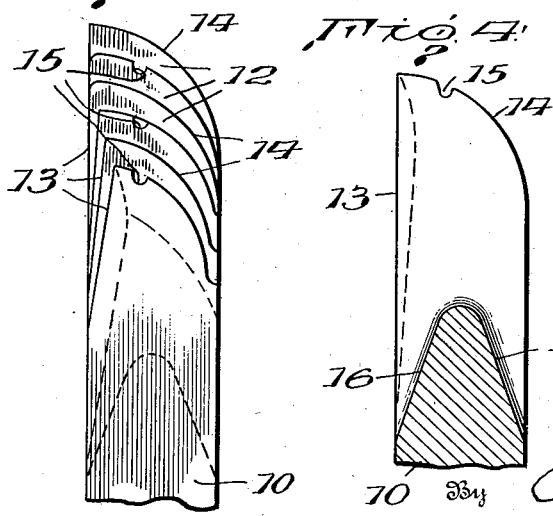
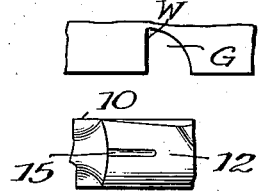
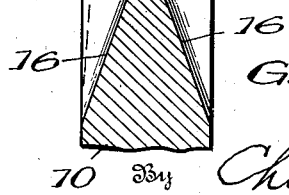
Inventor
G. A. Swenson,
By Church & Church
His Attorneys Patented May 30, 1939

2,160,568

UNITED STATES PATENT OFFICE 2,160,568

STONE WORKING TOOL

Gustave A. Swenson, Champaign, Ill.

Application November 2, 1938, Serial No. 238,464

2 Claims. (Cl. 125—38)

This invention relates to improvements in stone-working tools and, particularly, to tools of the type known as drip and raglet tools, which are used for cutting relatively long grooves in the surface of a stone.

The primary object of the invention is to provide a tool with which the time required for cutting or forming drip or raglet grooves in the surface of a stone is minimized and the cost of such stone-working operations materially reduced.

A further object is to provide a tool of the character indicated and with which the raglet or drip groove can be cut in the stone with only one or two trips of the tool across the face of the stone.

Another object of the invention is the provision of a tool which, in addition to minimizing the time required for forming the drip or raglet groove, will also insure the formation of grooves having unmarred and sharply defined side walls.

A still further object is the provision of a stone-cutting tool of the type described formed with means for preventing the accumulation of chips or particles of stone between the teeth of the tool.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a side elevation of a stone-cutting tool embodying the present invention;

Fig. 2 is an edge view of the tool;

Fig. 3 is an end elevation of the tool;

Fig. 4 is a sectional view on the line 4—4 of Fig. 1;

Fig. 5 is a detail view of a modified form of tooth which may be utilized; and

Fig. 6 is a sectional view of a small portion of a stone having a raglet groove therein.

The so-called "drip" tool which has been adopted for the purpose of illustrating the present invention may be generally described as comprising essentially a body portion 10 having a series of stone-cutting teeth along one edge which will be referred to as the bottom edge of the tool, and a shank 11 for securing the tool in the tool stock (not shown). The shank 11 is preferably removably secured to the body 10 in order to facilitate resharpening of the teeth. While a drip tool is illustrated, the invention is applicable to other stone-working tools, for instance, raglet tools and tools for cutting grooves of various shapes, as above indicated.

The edge of the tool body is formed with a series of teeth 12 extending from the front end to the rear thereof and, in the case of the drip tool, each tooth has a cutting edge composed of a straight portion 13 at one side thereof merging at the tip of the tooth into a curved portion 14, this contour of the cutting edge generally corresponding to the cross-section of the groove G to be formed in the stone. As is illustrated best in Figs. 1 and 3, the teeth are each of a different size, the forward teeth being of less depth and width than the teeth at the rear of the tool body. Preferably, the rearmost tooth corresponds in depth and width to that of the groove to be produced, and each successive, preceding tooth is made shorter and thinner. In this way, the forward teeth engage and remove only a portion of the total amount of stone to be cut away, as do also the rearwardly-located teeth, but the last tooth in the series will result in the production of the finished groove.

Where the groove comprises a straight wall, such as indicated at W in Fig. 6, it is essential that this wall be clean-cut, or sharply defined, particularly at its ends. For this purpose, the straight portion 13 of the cutting edge of one or more, and preferably the first three teeth, is beveled or tapered toward the tip of the tooth as is more clearly shown in Fig. 3. Preferably, the bevel is more accentuated or pronounced on the foremost tooth, with the angle formed between the beveled edge and the corresponding edge of the rearmost tooth gradually diminishing on each succeeding tooth. In actual practice, very good results have been obtained with a tool such as shown, i. e., one with six teeth with the first three teeth beveled and the last three unbeveled, so that their side edge corresponds to the straight wall W of the groove.

It will be observed that the width of successive teeth varies not only because of this tapering or beveling of the straight portion 13 of the cutting edge, but also because the curved portions 14 of successive teeth are struck on different radii.

It has also been discovered that the groove can be cut with a more regular surface if the cutting edges of at least a portion of the teeth are notched. Accordingly, each alternate tooth is formed with a recess 15 in its surface at the tip thereof. The presence of these notches or recesses 15 permits the tool to cut deeper with less likelihood of chipping the surface worked upon.

To further facilitate the cutting action of the tool, care is taken to prevent chips or particles of stone accumulating between the teeth. This is accomplished by gouging or deeply recessing the sides of the tool body at the bases of the teeth or between the bases of contiguous teeth as shown at 16. Thus, ample clearance is provided to permit the escape of particles of stone removed by the cutting edges, even though some particles might be rather large.

Referring to the modified form of tooth illustrated in Fig. 5, the front or transverse face of the cutting edge is of concave formation. With teeth of this formation, if there is any tendency of the stone to chip off, the line of fracture runs inwardly with respect to the side edges of the tool, thus eliminating danger of marring the surface of the groove being cut.

With a tool of this construction, embodying a row of teeth of successively increasing depth and width and with the side cutting edges of the foremost tooth or teeth beveled or tapered, a drip groove can be cut in a stone in a minimum length of time. Usually the tool is mounted in a stock or support fixed with respect to a planer bed on which the stone is supported and by which the stone is reciprocated with respect to the stock and tool. In commercially practising the present invention, finished drip grooves are cut in the stone in a single trip of the planer bed as compared with five to seven trips necessary with the single cutting tool in use at the present time.

It should be added the deeply gouged portions 16 in the sides of the tool body prevent the accumulation of particles between the teeth and the building up of pressures against the walls of the groove such as would result in marring or disfiguring the surface of the groove or interfere with the cutting operation.

What I claim is:

1. A stone-cutting tool having a rearwardly extending series of teeth, each tooth in said series being of greater depth and width than the next preceding tooth with the rearmost tooth corresponding in depth and width to the depth and width of the groove to be cut in the stone, each tooth having side and bottom cutting edges, a plurality of the foremost teeth having their side cutting edges tapered toward the bottom edge, the tapering of successive teeth diminishing rearwardly of the tool, and alternate teeth in said series having rearwardly disposed grooves in their bottom cutting edge.

2. A tool for cutting raglet and drip grooves in the surfaces of stone, said tool having a series of teeth extending rearwardly thereof with the rearmost tooth corresponding in width and depth to that of the groove to be cut, a plurality of forward teeth being of less depth than said rearmost tooth, each tooth having a side cutting edge with the side cutting edges of said forward teeth inclined at different angles with respect to the corresponding cutting edge of the rearmost tooth, and with the foremost tooth having the greatest inclination and the degree of inclination of the several teeth decreasing rearwardly of the tool.

GUSTAVE A. SWENSON.